United States Patent [19]
Berninger

[11] 3,960,123
[45] June 1, 1976

[54] ENGINE SPEED MAINTAINING APPARATUS

[76] Inventor: Kenneth L. Berninger, 7225 N. Dearborn Ave., Indianapolis, Ind. 46240

[22] Filed: Oct. 4, 1974

[21] Appl. No.: 512,083

[52] U.S. Cl. .............................. 123/103 R; 180/108
[51] Int. Cl.² .......................................... F02D 11/08
[58] Field of Search ................ 123/98, 103 R, 100, 123/109; 180/108

[56] References Cited
UNITED STATES PATENTS

| | | | |
|---|---|---|---|
| 3,092,090 | 6/1963 | Berninger | 123/103 R |
| 3,133,610 | 5/1964 | Sheppard | 123/103 R X |
| 3,249,175 | 5/1966 | Baxter | 123/103 R X |
| 3,368,640 | 2/1968 | Bremer et al. | 123/103 R X |

*Primary Examiner*—Charles J. Myhre
*Assistant Examiner*—William C. Anderson
*Attorney, Agent, or Firm*—Woodard, Weikart, Emhardt & Naughton

[57] ABSTRACT

An internal combustion engine with vacuum operated bellows for maintaining a throttle position, has a fan pressure responsive control for the vacuum applied to the bellows. A manual adjustment is provided, for speed to be maintained, and a brake pedal operated switch vents the vacuum of the bellows to disable the control until manually reinstated by pushing a button.

11 Claims, 6 Drawing Figures

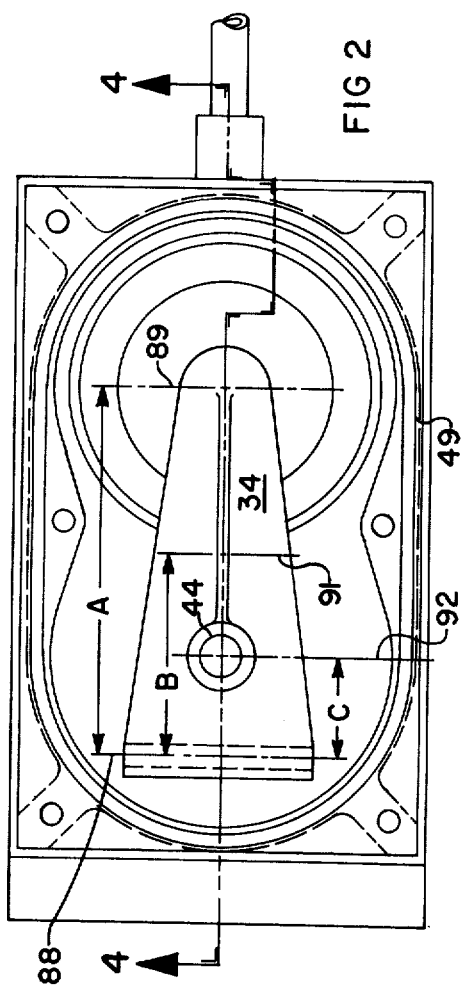
FIG 2
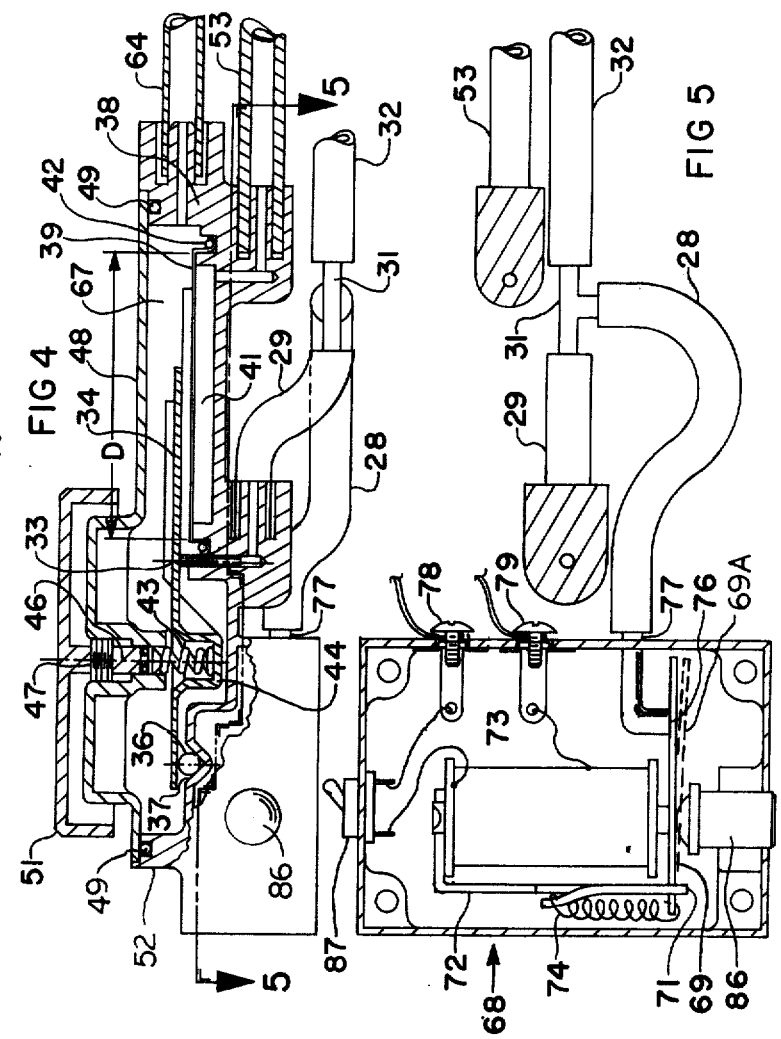
FIG 4
FIG 5
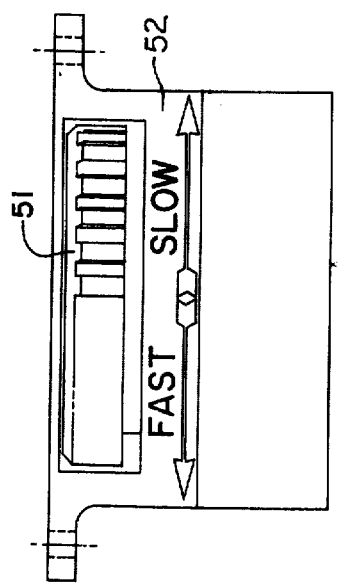
FIG 3

ENGINE SPEED MAINTAINING APPARATUS

BACKGROUND OF THE INVENTION

1. Field of the Invention

This invention relates generally to engine and vehicle speed controls, and more particularly to a manifold vacuum operated, fan pressure responsive engine speed controller.

2. Description of the Prior Art

Many devices are known for controlling speed of engines and speed of vehicles. Since this invention relates primarily to internal combustion engines, perhaps it is appropriate to mention that there are many patents dealing with these also. While it is well known to use automatic controls to maintain vehicle speed (an example of a U.S. Pat. on that subject being No. 2,916,100 issued Dec. 8, 1959 to Teetor), it is my opinion that it is uneconomical and undesirable to attempt to maintain vehicle speed constant, particularly when traveling up steep grades or with a heavy load. Therefore I have been more interested in units responsive to engine speed and, in such instances, if the driver feels the vehicle is moving too slowly, he can increase the speed sometimes by actually pushing harder on the accelerator throttle pedal.

Some patents which disclose devices responsive to speed of internal combustion engines are as follows:

| | | |
|---|---|---|
| 2,527,354 | R. H. Christian | October 24, 1950 |
| 2,556,485 | E. V. Robnet, Jr. | June 12, 1951 |
| 2,990,825 | J. L. Fuller et al | July 4, 1961 |
| 3,092,090 | K. L. Berninger | June 4, 1963 |

While I believe that my patent listed above is perhaps the closest art to my present invention, there are some significant differences. One is that, whereas my patented mechanism responded to air flow developed by an electric generator cooling fan, my present invention responds to pressure developed by such a fan. It is thereby more readily adaptable for automotive after market installations on various types and constructions of generator or alternator assemblies. Also it is of simpler construction.

SUMMARY OF THE INVENTION

Described briefly, in a typical embodiment of the present invention, means are provided for picking up pressure from a fan of an engine accessory and responding to that pressure to control vacuum reaching a throttle control, from a source of vacuum on the engine. Brake pedal operable switch means are employed for removing the speed maintaining vacuum, and manual re-instatement means are provided.

Brief Description of the Drawings

FIG. 2 is a top view of the manual control box with the cover removed.

FIG. 3 is a front view of the control box.

FIG. 4 is a section through the manual control taken at line 4—4 in FIG. 2 and viewed in the direction of the arrows.

FIG. 5 is a section through the manual control box taken at line 5—5 in FIG. 4 and viewed in the direction of the arrows showing the safety solenoid.

FIG. 6 is a side view of a portion of FIG. 1 showing a mounting of the fan pressure sensing pick-up to an alternator.

DESCRIPTION OF THE PREFERRED EMBODIMENT

Figure 1:
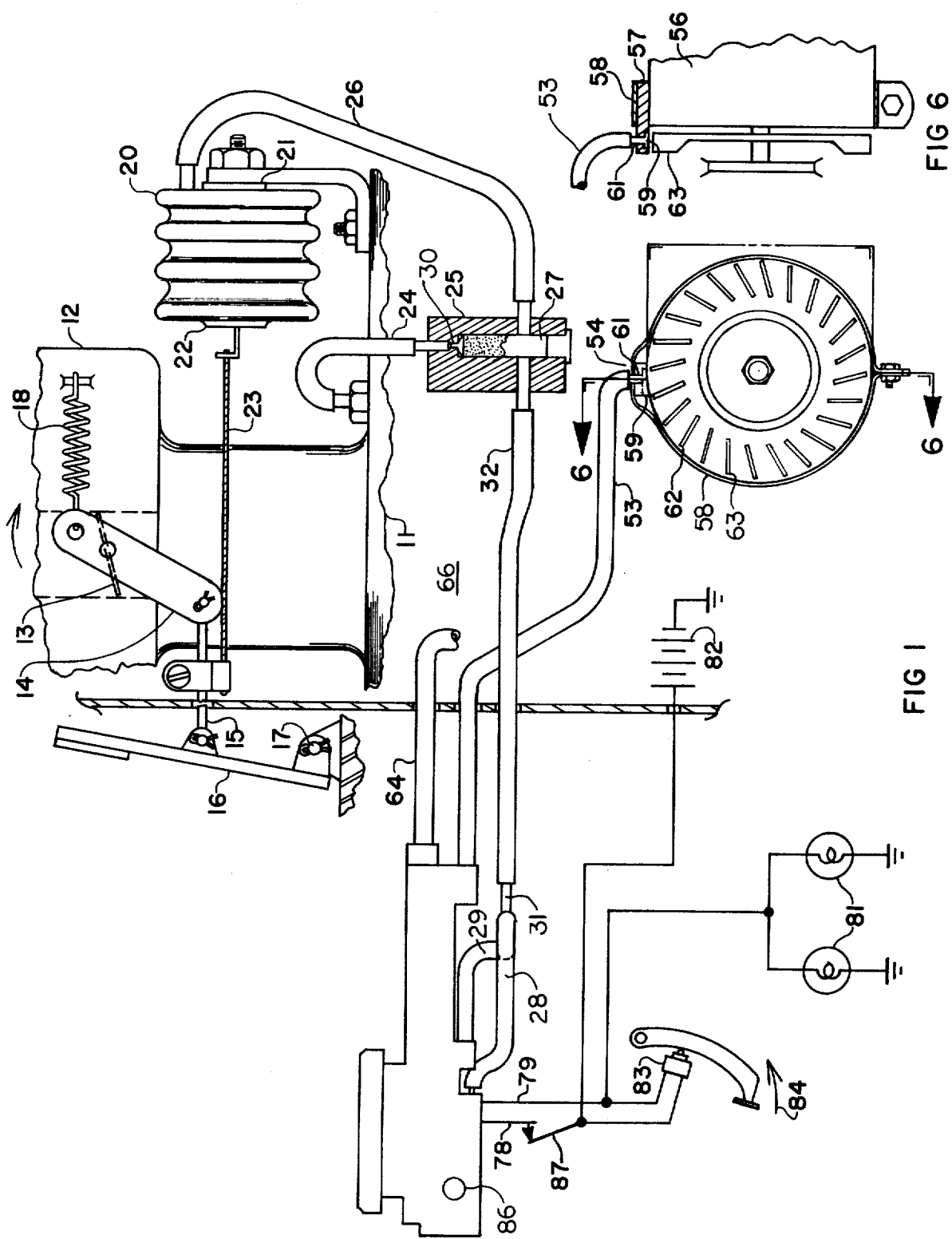
FIG. 1 is a diagram of the complete system incorporated in a vehicle.

Referring now to the drawings in detail, and particularly to FIG. 1, the internal combustion engine includes an intake manifold 11 on which a carburetor 12 is mounted having a throttle blade 13 in the throttle body. A lever 14 at the end of the throttle shaft is connected by a link 15 to the accelerator pedal 16 pivoted to the floor of the vehicle at 17. A tension spring 18 normally pulls the lever 14 in a throttle blade closing direction (clockwise in FIG. 1).

A bellows 20 has one end 21 affixed to a bracket secured to the manifold, and the other end 22 is connected to a cable 23 which is secured by a clamp to the throttle link 15. Therefore, when vacuum is applied to the bellows, it will tend to open the throttle and increase engine speed. This vacuum is obtained from the intake manifold 11 through the line 24 and the filter and orifice body 25 and line 26 connected to the bellows. Admission of air to the chamber 27 in the body 25 defeats the throttle opening function of the bellows. This admission of air can occur through the line 28 from the control box or through line 29 from the control box, both of which are connected through a tee 31 and from there through a line 32 to the filter and orifice body 25.

As best shown in FIG. 4, the control box includes a valve port 33 closed by the bottom surface of a valve arm 34 (also see FIG. 2) having a pivot pin 36 received in a pivot groove 37 in the valve 38. A diaphragm 39 is stretched across the top of the circular cavity 41 and secured and sealed in the annular groove surrounding the cavity by means of a retaining ring 42. A spring 43 having its lower end disposed in the spring cup 44 of the valve has its upper end engaged and loaded by the lower end of the speed selector wheel shaft 46, this shaft being threadedly received at 47 in the cover plate 48 which is fastened to the valve body by six screws through apertures shown in FIG. 2, and sealed around its perimeter by a rubber seal 49 of circular cross section. Therefore, in the absence of pressure in chamber 41 under the diaphragm 39, the valve arm closes the valve port 33 and seals it. The speed selector wheel 51, mounted to the shaft 46, is typically knurled on its outer circumference, as best shown in FIG. 3, and exposed to the interior of the vehicle above the legends "fast" and "slow" as shown on the end panel 52 of the control box in FIG. 3.

To obtain pressure under the diaphragm 41, there are two passageways therefrom as shown in FIG. 1 to the exterior of the valve body 38 and which communicate with a pressure line 53 connected therefrom to a pick-up unit 54 mounted to the alternator housing 56. As is best shown in FIG. 6, the pick-up unit includes a plate 57 secured to the alternator housing by a band 58 and having a slot 59 in the underside thereof, terminating in the plate immediately under the outlet 61 to the line 53. Typically the length of the slot 59 tangentially of the circle 62 of the fan blade tips 63 is less than the total spacing between blades or vanes. Yet, when placed close to the blade tip it has been found sufficient to respond to pressure produced by the blades as they are driven by the engine.

In view of the fact that many vehicles are air conditioned, and the control box is located in the passenger compartment, whereas the pressure pick-up is in the engine compartment, a pressure balancing line 64 is connected to the valve body 38 and exposed in the engine compartment 66 so that the pressure in chamber 67 of the valve body (FIG. 4) above the diaphragm 39 is the same as the pressure in the engine compartment, and thereby the pressure applied under the diaphragm truly represents the pressure established by the fan motion in response to increased or decreased engine speed.

In order to vent the vacuum upon application of brakes, a safety solenoid valve assembly 68 (FIG. 2) is employed. It includes a combination armature and valve 69 pivotally mounted at 71 in the bracket 72 affixed to the solenoid coil and core assembly 73 and urged in the clockwise direction by the return spring 74 so as to tend to unblock the port or open the end 76 of tube 77 secured to and extending from the valve body and to which the hose 28 is connected, this hose having been previously mentioned.

When the solenoid is energized by electric current through terminals 78 and 79, the armature is in the position shown in the drawing wherein it closes the port 76. When it is de-energized, the spring will pull it to a position such as shown by the dotted outline 69A whereupon it vents the port 76 to atmosphere and thereby, through the line 28, tee 31, line 32, orifice and filter body 25, and line 26, applies atmospheric pressure to the bellows, so that if no force is being manually applied to the accelerator pedal, the throttle closing spring 18 will close the throttle.

The vehicle stop lights 81 are connectable to the vehicle battery 82 by the stop light switch 83 which is closed when the brake pedal is pushed downward in the direction of arrow 84. At other times this switch is open. Therefore, since the solenoid assembly is connected in parallel with this switch, it can draw enough current to hold the armature 69 in the vent port closing position shown in FIG. 5, against the urging in spring 74, until the stop light switch is closed upon moving the brake pedal. Of course the resistance of this solenoid assembly is too high to interfere with proper illumination of the stop lights when the brake pedal is pushed. The current drawn and power of the solenoid 73 is not sufficient to pull the armature in against resistance of the spring 74 and therefore, once the solenoid is de-energized, it can only be restored to the valve closing position by manually pushing the reset button 86 which is exposed at the side of the housing in the passenger compartment.

OPERATION

In the use of this apparatus, it is inoperative whenever the safety port 76 is uncovered. As indicated above, this is accomplished whenever the stop light switch is closed. In the event that the stop light switch fails to close when it should, there is a toggle-type safety switch 87 in series with the solenoid and mounted to the left-hand side of the housing opposite the right-hand side mounting of the reset button 86. This safety switch is normally closed, but it can be opened to permanently disable the solenoid, if desired.

Having now established what it takes to keep the system de-activated, it is apparent that the vehicle can be driven normally under these conditions. Then, when it is desired to activate the unit, it is only necessary to push the button 86, being sure, of course, that switch 87 is closed, as it normally should be. Then, as the operator approaches a speed at which he wishes to drive, he can release the accelerator pedal and turn the knob 51 either clockwise to increase speed, or counterclockwise to decrease speed, until the desired speed is established. Typically this is done for a vehicle speed under normal road load conditions. As indicated above, if the vehicle is ascending a steep grade, the driver can adjust the control to whatever engine speed sounds appropriate to him, without regard to the vehicle speed.

Assuming again, operation under normal road load conditions, if the brake pedal is pushed, the unit immediately returns to manual control of throttle by the accelerator pedal. However, the driver need only push the button 86 to cause the unit to open the throttle adequately to again resume the engine speed at which he was previously operating, before application of the brake pedal. Therefore, this unit enables immediate re-establishment of the desired engine speed without further adjustment of the speed control knob 51.

In order to limit flow in the vacuum passageways, it is desirable that the orifice 30 in the orifice body be approximately 0.020 inches in diameter. Also, it has been found that the generator or alternator fans or construction of the assemblies is such that different pressure pick-up points are needed for vehicles having alternators or generators of different manufacture. For example, it has been found that on engines equipped with recent production alternators manufactured by Delco Remy Divison of General Motors Corporation, a pressure in line 53 of 0.70 inches of water can be readily secured at a normal road load speed of 30 miles per hour, and 3.72 inches of water at normal road load speed of 70 miles per hour. On the other hand, for recent production alternators manufactured by Chrysler Corporation, the pressure obtainable in line 53 at 30 miles per hour is 0.25 inches of water, and at 70 miles per hour it is 1.62 inches of water. Therefore, it is desirable to employ different spring rates for spring 43, depending upon the particular fan to which the unit is to respond. For example, for a spring having a 0.180 outside diameter, for use with fans having the lower pressure capability, a spring having a free length of 0.50 inches and rate of 4.5 pounds per inch may be employed, while for the installations with fans having a higher pressure capability, a free length of 0.375 inches and rate of 6 pounds per inch may be preferable.

Since the present invention functions in response to small changes of pressure, and involves small movements to achieve its objective, an example of some dimensions employed in the illustrated example may be appropriate. Such exemplary dimensions are as follows, referring to FIGS. 2 and 4.

| | |
|---|---|
| Dimension A — Pivot Centerline 88 to Diaphragm Centerline 89 | 2.38 Inches |
| Dimension B — Pivot Centerline 88 to Control Port Centerline 91 | 1.32 Inches |
| Dimension C — Pivot Centerline 88 to Spring Centerline 92 | 0.63 Inches |
| Dimension D — Diamter Between Inner Edges of Seal Ring on Diaphragm 42 | 1.875 Inches |

The invention claimed is:

1. An engine speed responsive control for an internal combustion engine comprising:
   an engine fuel intake control;
   a fluid operated driver for said intake control;
   a pressure responsive control valve means coupled to said driver and operable upon sensing a pressure above a predetermined level to disable said driver,
   said control valve means including a first input for a source of pressure, a valve port, and a valve member operable to normally close said valve port but movable to open said valve port;
   an engine driven fan;
   a pressure pick-up at said fan to develop pressure in response to fan motion; and
   a conduit coupling said pick-up to said first input for transmitting to said input, pressure from said pick-up.

2. The control of claim 1 wherein:
   said control valve means include a chamber communicating with said first input and having a wall movable by pressure in said chamber, said movable wall being disposed to move said valve member to open and close said valve port.

3. The control of claim 2 and further comprising:
   an enabling device including an electromagnet;
   a second valve port;
   a second valve member operable to close and open said second valve port, said second valve member being movable by said electromagnet so that said second valve member holds closed said second port when said electromagnet is energized, and said second valve member having spring means connected thereto to move said member to port opening condition when said magnet is de-energized.

4. The control of claim 3 wherein:
   said spring means is strong enough to keep said electromagnet from causing said second valve member to close said second port when energized unless external force is applied to said second valve member.

5. The control of claim 4 and further comprising:
   a manual reset button engageable with said second valve member and operable when manually pushed to aid said electromagnet in moving said second valve member to port closing position.

6. The control of claim 5 further comprising:
   vehicle stop light means;
   vehicle electrical energy source means;
   a normally open switch in series with said energy source and said light means and operable when closed to energize said light means;
   said magnet being in parallel with said switch and substantially de-energized when said switch is closed to thereby disable said magnet from holding closed said second port means.

7. The control of claim 6 wherein:
   said pressure responsive control valve means is coupled to said driver through a conduit coupled to said driver and to the first mentioned valve port and the second mentioned valve port.

8. The control of claim 7 and further comprising:
   an engine vacuum tap;
   a conduit coupling said vacuum tap to said driver and communicating engine vacuum to said driver to cause said driver to move said fuel intake control in a flow increasing direction in response to increases in engine vacuum at said tap;
   the conduit coupled between said ports and said driver serving to supply air to said tap whenever either of said valve members is open, to reduce vacuum applied to said driver.

9. The control of claim 8 and further comprising:
   a flow restricting orifice between said tap and said conduits to preclude excessively quick operation of said driver upon pushing said reset button during minimal pressure conditions at said pick-up.

10. The combination of claim 9 and further comprising:
    A manually adjustable wheel and loading spring connected to said first mentioned valve member and operable to select and predetermine said level of pressure for disabling said driver from causing further movement of said fuel intake control in a flow increasing direction.

11. The combination of claim 10 and further comprising:
    an engine compartment and passenger compartment, said control valve means being located in said passenger compartment and said pressure pick-up being in said engine compartment;
    pressure balancing means coupled from said engine compartment to said control valve means;
    said reset button and said selector control being located and exposed in said passenger compartment.

* * * * *